United States Patent
Dressel et al.

(10) Patent No.: US 6,799,041 B1
(45) Date of Patent: Sep. 28, 2004

(54) METHOD FOR SETTING UP A CONNECTION BETWEEN A MOBILE RADIO NETWORK AND A DESTINATION CALL NUMBER IN A PRIVATE COMMUNICATION NETWORK

(75) Inventors: Jan Dressel, Bad Honnef (DE); Jens Hake, Kemtau (DE)

(73) Assignee: T-Mobile Deutschland GmbH, Bonn (DE)

( * ) Notice: Subject to any disclaimer, the term of this patent is extended or adjusted under 35 U.S.C. 154(b) by 0 days.

(21) Appl. No.: 09/647,775

(22) PCT Filed: Apr. 1, 1999

(86) PCT No.: PCT/DE99/01022

§ 371 (c)(1),
(2), (4) Date: Feb. 1, 2001

(87) PCT Pub. No.: WO99/52255

PCT Pub. Date: Oct. 14, 1999

(30) Foreign Application Priority Data

Apr. 7, 1998 (DE) .......................................... 198 15 430

(51) Int. Cl.⁷ ................................................ H04Q 7/20
(52) U.S. Cl. .................................... 455/445; 455/426.1
(58) Field of Search ................................ 455/555, 554, 455/445, 426.1, 465, 462, 464, 414; 379/231, 232, 233, 234

(56) References Cited

U.S. PATENT DOCUMENTS

| | | | |
|---|---|---|---|
| 5,369,684 A | * 11/1994 | Buhl et al. ................... | 455/432 |
| 5,566,236 A | 10/1996 | MeLampy et al. | |
| 5,890,064 A | * 3/1999 | Widergen et al. ........... | 455/445 |
| 6,181,938 B1 | * 1/2001 | Salmela et al. .............. | 455/433 |
| 6,285,879 B1 | * 9/2001 | Lechner et al. ............. | 455/432 |
| 6,539,237 B1 | * 3/2003 | Sayers et al. ................ | 455/555 |

FOREIGN PATENT DOCUMENTS

| | | |
|---|---|---|
| WO | WO 92/13428 | 8/1992 |
| WO | WO 96/21323 | 7/1996 |
| WO | WO 97/34437 | 9/1997 |

* cited by examiner

*Primary Examiner*—Nick Corsaro
(74) *Attorney, Agent, or Firm*—John M. Harrington; Kilpatrick Stockton LLP

(57) ABSTRACT

A method for setting up a connection between a mobile radio network and a destination call number in a private communication network via a mobile radio network gateway. According to the inventive method, a call request is transferred from a mobile terminal to the mobile radio network gateway. The mobile radio network gateway begins by setting up a connection to the desired destination call number of the private network and, once this has been successfully achieved, subsequently sets up a connection to the mobile terminal.

8 Claims, 6 Drawing Sheets

METHOD FOR SETTING UP A CONNECTION BETWEEN A MOBILE RADIO NETWORK AND A DESTINATION CALL NUMBER IN A PRIVATE COMMUNICATION NETWORK

FIELD OF THE INVENTION

The present invention is a procedure for setting up a connection of a mobile radio network to a target destination call number of a private communication network.

BACKGROUND OF THE INVENTION

Large customers can connect their private communication network (e.g. extension equipment) directly with a mobile radio network by so-called "direct access," and can, consequently, handle connections between the mobile terminal and the extension equipment to the net internal tariff cost effectively. This is not feasibly possible for smaller business customers because it is too costly and expensive.

Therefore, mobile radio network gateways (so-called Gateways as, for example, GSM Gateways) are developed. Connections from extension equipment in a mobile radio network to a net internal tariff can be developed cost effectively. However, the reverse—that is, a connection from the mobile terminal directly to an extension connection has not been possible. The solutions offered in the market place respective to this subject are as follows (also see FIG. 1):

The mobile user dials only the Gateway mobile radio number.

Gateway immediately connects.

The mobile participant can now choose the desired extension or call connection by means of several frequency selections or by speech control.

The disadvantage of this operating method for the customer is that there is no direct dialing from the mobile terminal to make calls and that the connection fees are charged from the moment the connection is made by the Gateway. Even if the call made is busy or not answered, the connection fees for the mobile radio network are charged.

The prior art made known by DE 196 23 689 is a procedure to support private numbering plans by open telecommunication networks, which permit a connection of a private telecommunication network over a public internetwork into another private telecommunication network. An "Intelligent Network" (IN) guarantees the transmission to the extension of the private telecommunication network. However, this prior art does not solve the problem named above if the access results from a private telecommunication network by means of a mobile radio network.

SUMMARY OF THE INVENTION

The task of the present invention is to prepare a more simplified procedure and more advantageous and cost effective connection system of a mobile radio network into a private communications network. The invention is not restricted to only the private telecommunication network with extension equipment or speech communication networks, but can also find applications in regard to access to data- or computer networks, for example.

Consequently, the present invention offers the following advantages:

Connection fees for the utilization of mobile radio access equipment for the direct access of a mobile radio network into a private communication network are charged only if the desired connection is actually made.

Connections of the extension equipment can be directly accessed.

A "virtual private network" (VPN) can be realized without a leased line connection of the extension equipment to the mobile radio network being necessary.

The mobile radio network gateway can, preferably, in the framework of the connection desired, be relayed from the desired target, destination call number by the private network or extension equipment from the mobile terminal's end, so that a connection can be made using this information before the connection is accepted from the mobile radio network within the private network to the desired extension connection. Only when this connection is made, is the conversation accepted from the mobile radio network.

During the call setup, the desired destination call number of an extension equipment can be transferred to such a GSM-gateway working as a mobile radio network gateway especially in a suitable information element.

With the help of an Intelligent Network (IN), a corresponding call number conversion can be completed. Additionally, while the usual INAP-connect communication in the Intelligence Network (IN) is being utilized, additional information elements can be suitably modified or started anew during the call's construction, which can result in an improved or facilitated transmission of information over the desired destination call number to the mobile radio network gateway.

The mobile radio network gateway or evaluation equipment interconnected with this equipment (for example, an Intelligent Network) can evaluate the information components received during the construction of the call so that the destination call number can be detected.

On the basis of FIGS. 1 to 3, as well as the following affiliated descriptions, the represented designs and embodiments of the invention-related system with reference to a mobile radio network, according to the GSM standards and the usual data configurations, are clarified.

BRIEF DESCRIPTION OF THE DRAWINGS

FIG. 1b:

The following process is represented:
(1) Connection set-up of MS_XY to MSC/SSP serving MS_XY (SETUP)
(2) IN inquiry (IDP/CONNECT)
(3) Connection set-up to MSC serving MS_PABX (IAM)
(4) Connection set-up of MSC serving MS_PABX to MS_PABX/GSM Gateway (SETUP)
(5) Connection set-up of GSM Gateway to PABX connection

DETAILED DESCRIPTION

During the call setup, the desired destination call number of an extension equipment is being transferred to the GSM Gateway as a mobile radio network gateway in a suitable information element. With help of a corresponding Intelligent Network (IN) service, a respective call number transposition is completed. Additionally, with the INAP connect communication's application, further information elements can be suitably modified or newly introduced during the call's construction, so that the GSM Gateway can transmit the information over the desired extension connection.

The GSM Gateway again evaluated the information received during the call's construction so that the extension connection's call number can be detected. If such a number is detected, it tries to construct an extension internal connection to the desired connection. Then, first, only if this connection is made, the communication is accepted from the mobile radio network.

In order to relay the extension connection's target destination call number, the following suggestions are possible solutions (basically, various suitable information elements of the SET-UP information can transport the desired information to the mobile radio network gateway):

- The desired extension connection is transmitted as Calling_Line_Identification (CLI). Thus, the desired extension connection is relayed as a Calling_Party in the SETUP information to the GSM Gateway.
- The desired extension connection is transmitted as Unstructured_SS_Data (USSD). Thus, the desired extension connection is relayed as User_User_Facility in the SETUP information.
- The desired extension connection is transmitted as Called_Party. Thus, the desired extension connection is relayed as Called_Party_BCD_Number in the SETUP information to the GSM Gateway.
- The desired extension connection is transmitted as Called_Party_Subaddress. Thus, the desired extension connection is relayed as Called_Party_Subaddress in the SETUP information to the GSM Gateway.

Figure 1A:
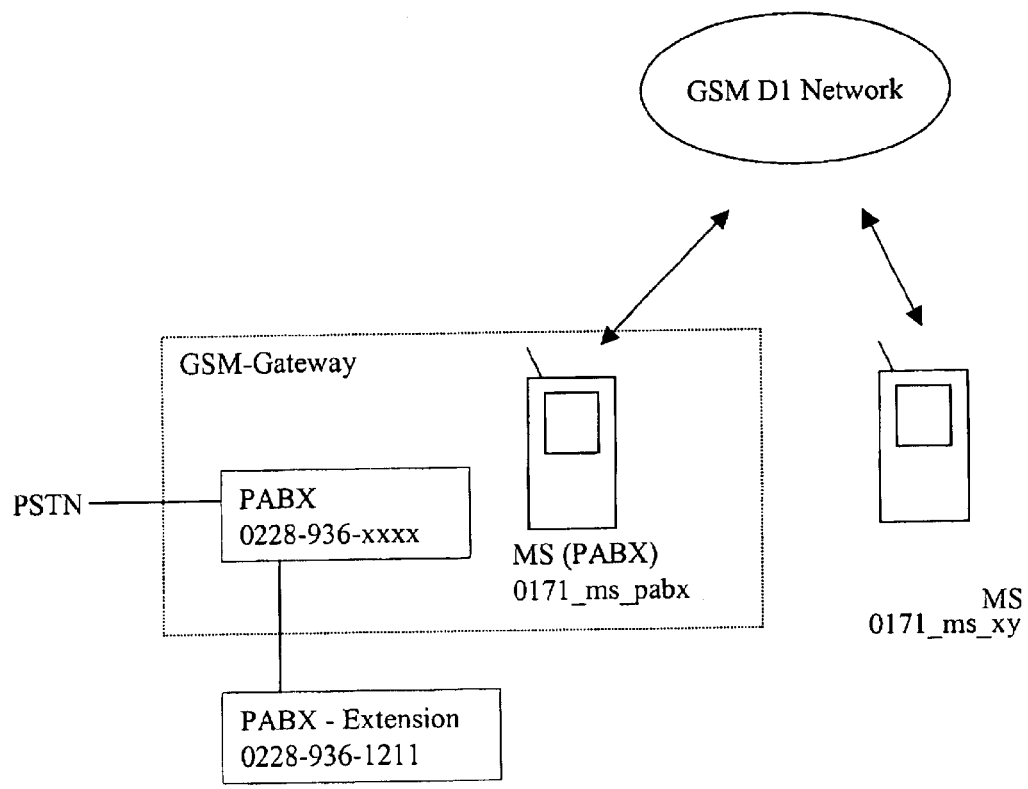
FIG. 1a shows a procedure for setting up connections according to the state of technology
Figure 1B:
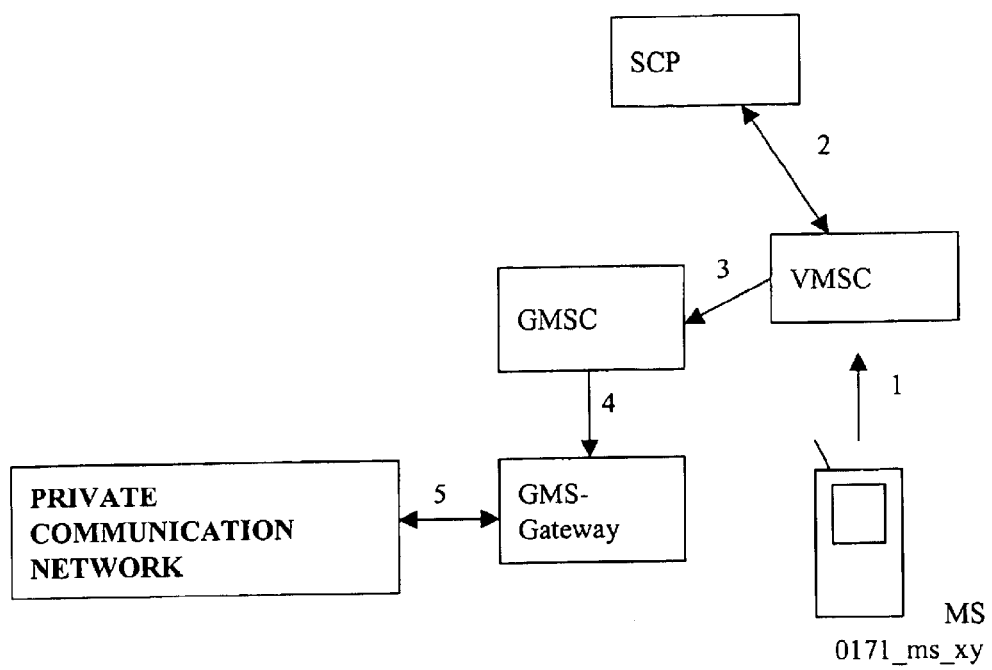
FIG. 1b shows an example of information flow during the construction of the connection and the involved network elements.
Figure 2A:
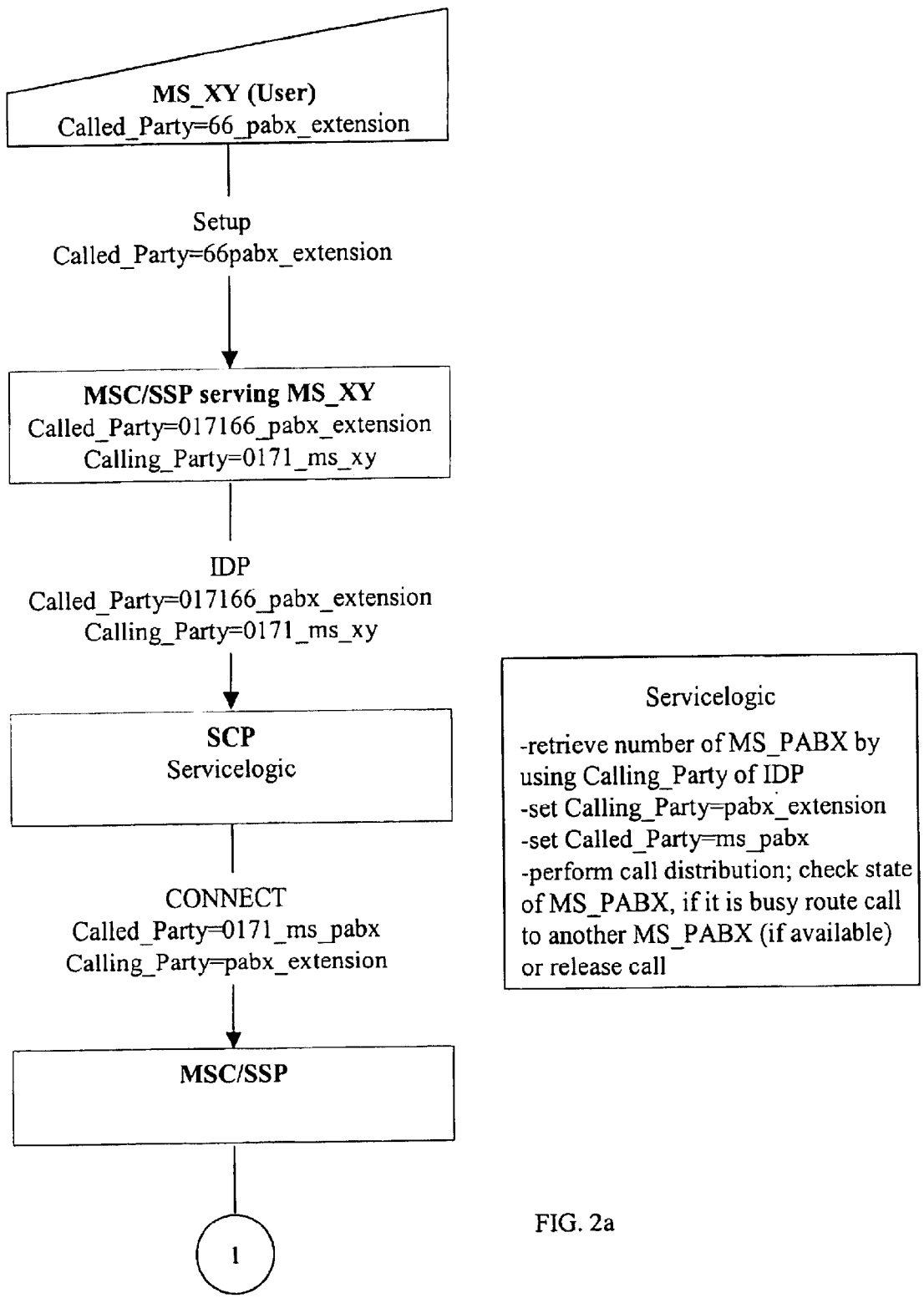
FIGS. 2a and 2b show a flow process chart of the connection set-up with which the desired target destination call number is conveyed as Calling_Line_Identification (CLI).
Figure 2B:
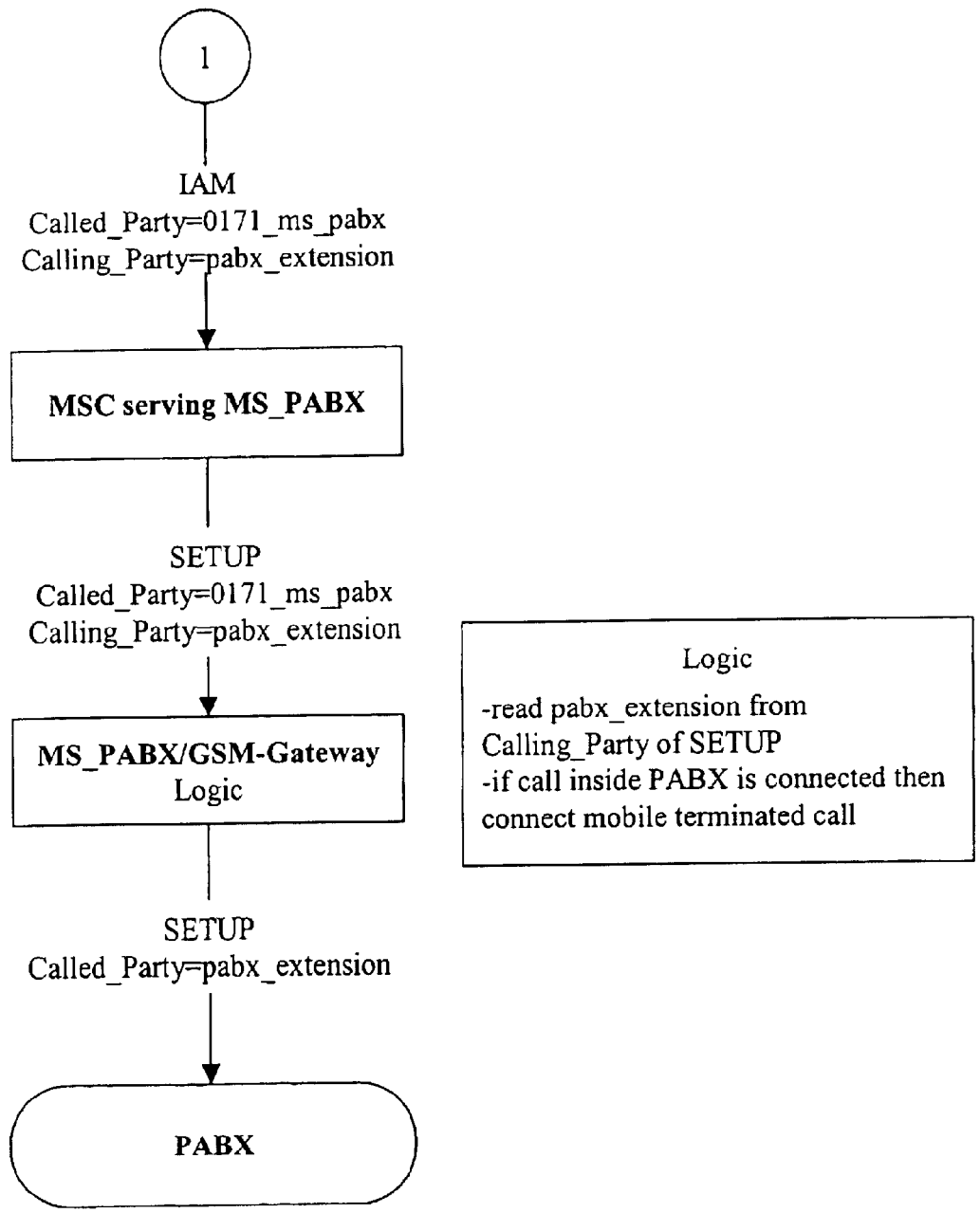
Figure 3A:
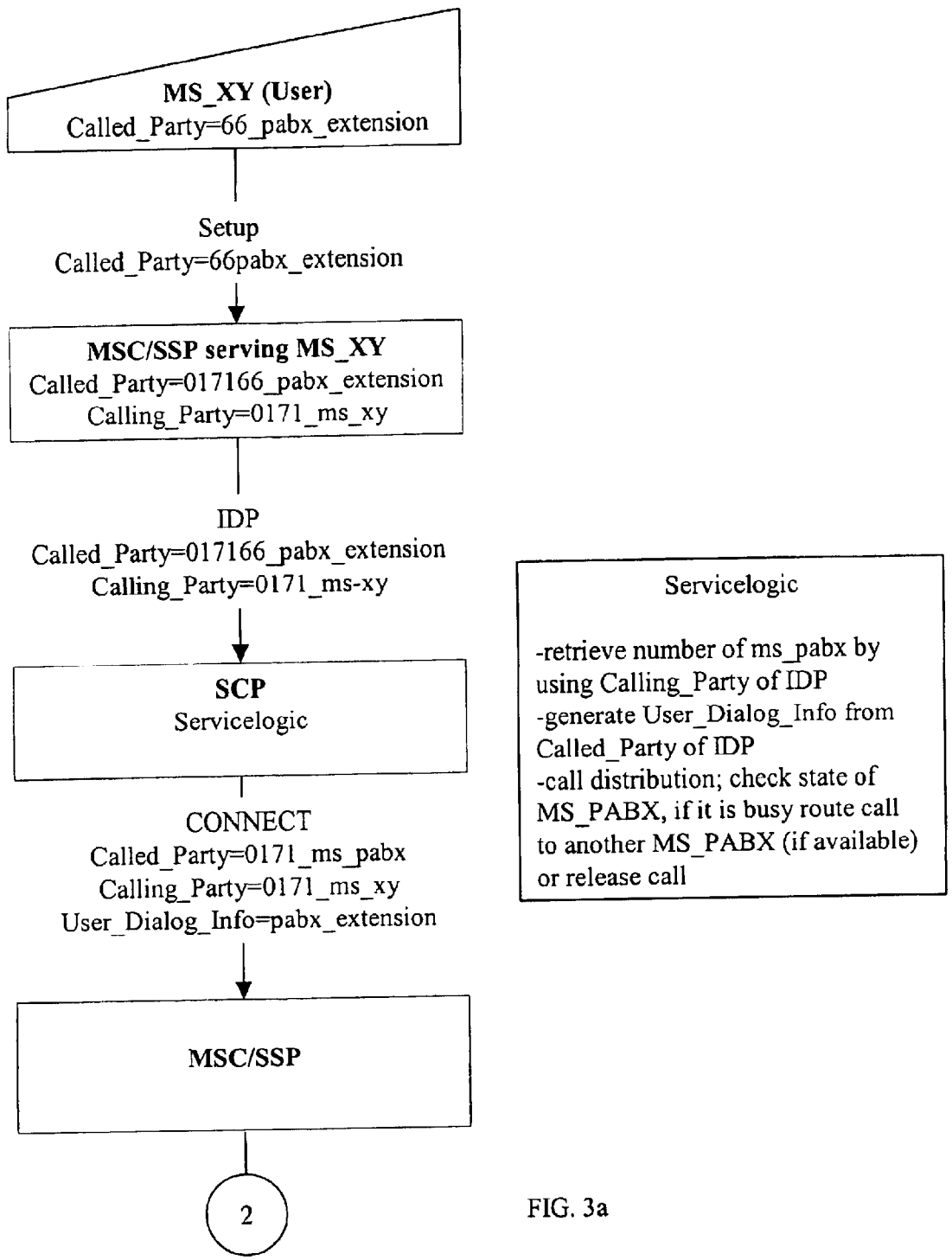
FIGS. 3a and 3b show a flow process chart of the connection set-up with which the desired target destination call number (call connection) is conveyed as Unstructured_SS_Data.
Figure 3B:
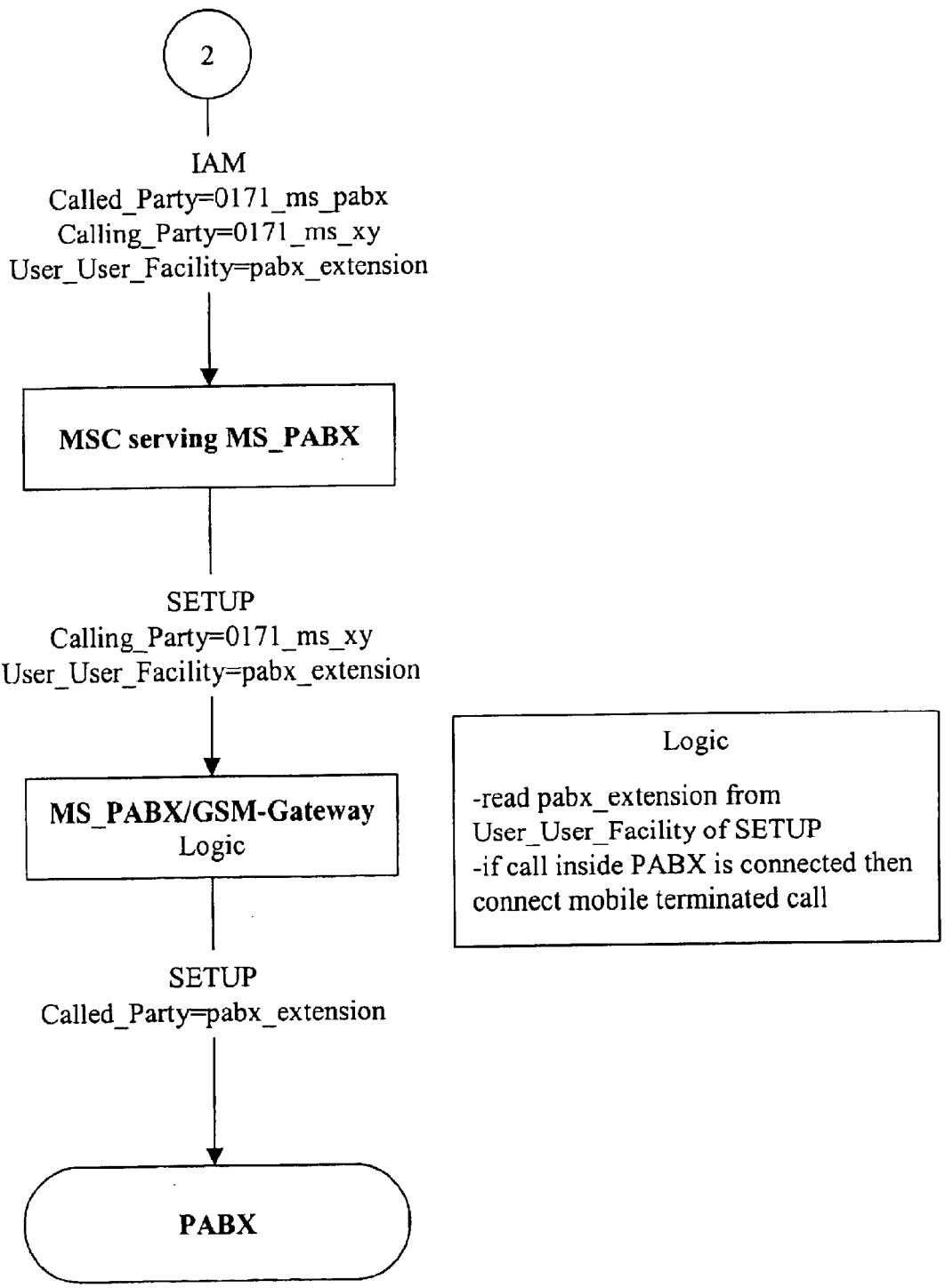

In FIGS. 2a and 2b the flow process diagram of the connection's set-up is represented; the desired target destination call number (extension connection) is transmitted as Calling_Line_Identification (CLI). FIGS. 3a and 3b show the second example of a flow process diagram of a connection's set-up; the desired target destination call number (extension connection) is transmitted as Unstructured_SS_Data.

What is claimed is:

1. Procedure to set-up a connection from a mobile radio network to a target destination call number of a private communication network over a mobile radio network gateway by which a desired connection from a mobile terminal to the mobile radio network gateway can be relayed, comprising:

the mobile radio network gateway, which first initiates setting up a bearer channel connection from the mobile radio network gateway to the desired target destination call number of the private communications network and, if successful, then builds a bearer channel connection from the mobile radio network gateway to the mobile terminal after first setting up the bearer channel connection from the mobile radio network gateway to the desired target destination call number.

2. Procedure, according to claim 1, wherein:

during setup of the desired call, the target destination call number of the private communication network is transmitted from the mobile terminal to the mobile radio network gateway.

3. Procedure, according to claim 2, wherein:

an evaluation of the target destination call number by a connected evaluation device with the mobile radio network gateway results by an Intelligent Network.

4. Procedure, according to claim 2, further comprising:

a call number conversion or transposition, which results on the side of the mobile radio network gateway.

5. Procedure, according to claim 2, wherein:

in addition to the target destination call number, still additional information elements are modified or newly introduced to complete the connection structure or set-up from the mobile radio network gateway to the private communications network by an Intelligent Network.

6. Procedure to set-up a connection from a mobile radio network to a target destination call number of a private communication network over a mobile radio network gateway by which a desired connection from a mobile terminal to the mobile radio network gateway can be relayed, comprising:

transmitting the target destination call number of the private communication network from the mobile terminal to the mobile radio network gateway for setup of the desired connection;

evaluating the target destination call number by evaluation devices to detect the target destination call number;

if the target destination call number is detected, initiating setup of a bearer channel connection from the mobile radio network gateway to the desired target destination call number of the private communications network by the mobile radio network gateway; and after the bearer channel connection is set up from the mobile radio network gateway to the desired target destination call number of the private communications network, setting up a bearer channel connection from the mobile radio network gateway to the mobile terminal.

7. Procedure, according to one claim 6, further comprising:

performing a conversion or transposition of the target destination call number via the mobile radio network gateway.

8. Procedure, according to claim 6, further comprising:

modifying or introducing information elements by an Intelligent Network, in addition to the target destination call number, to complete the setup of the desired connection from the mobile radio network gateway to the private communications network.

* * * * *